April 16, 1968
D. A. FOGG
3,378,125
TELESCOPIC CONVEYOR
Filed Aug. 17, 1966
3 Sheets-Sheet 1
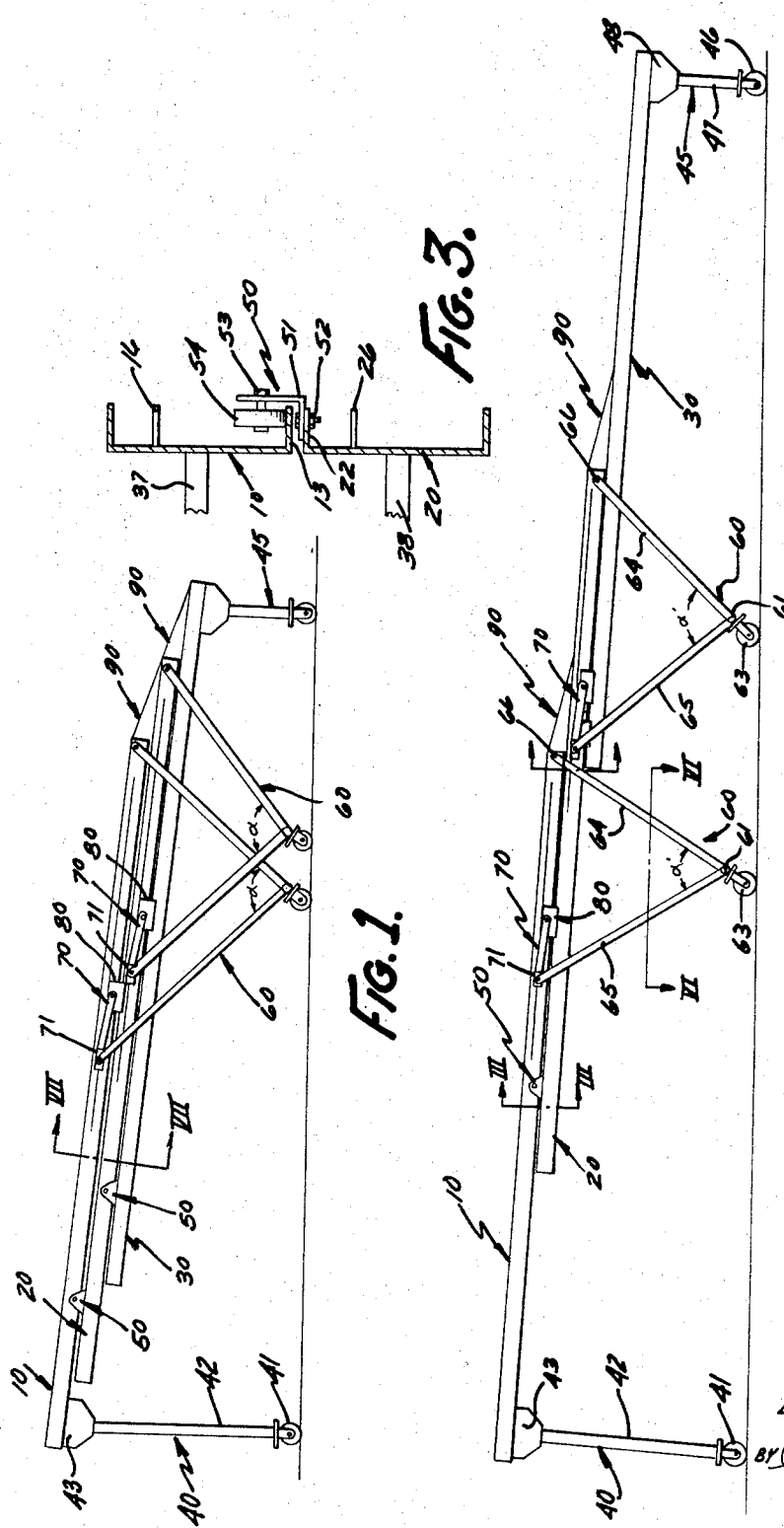
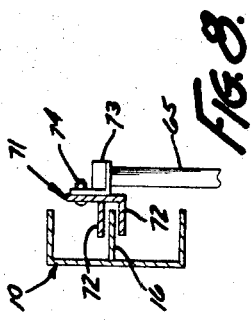
INVENTOR.
DANIEL A. FOGG
BY Price & Heneveld
ATTORNEYS

INVENTOR.
DANIEL A. FOGG
BY
ATTORNEYS

April 16, 1968  D. A. FOGG  3,378,125
TELESCOPIC CONVEYOR
Filed Aug. 17, 1966  3 Sheets-Sheet 3
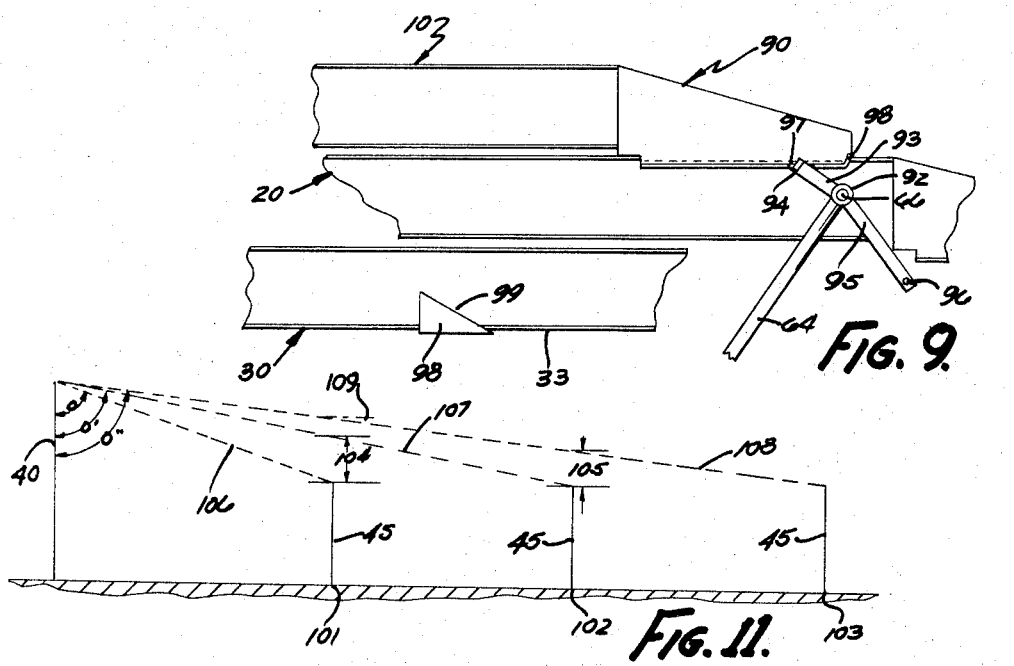
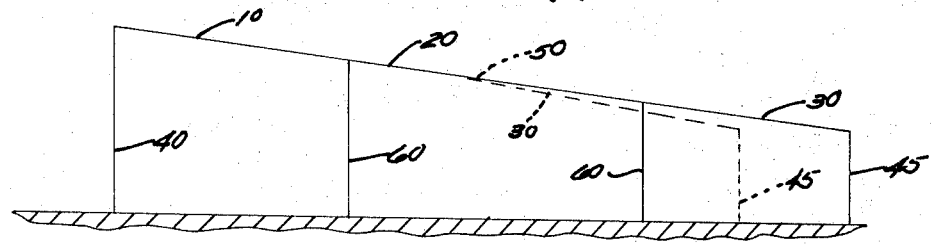
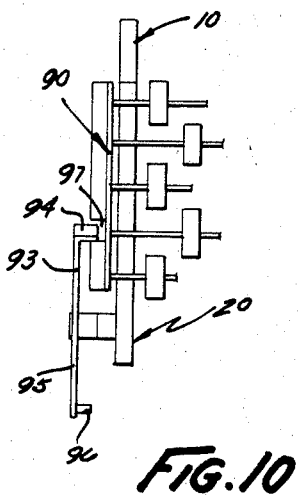
INVENTOR.
DANIEL A. FOGG
BY Price & Heneveld
ATTORNEYS 3,378,125
TELESCOPIC CONVEYOR
Daniel A. Fogg, White Cloud, Mich., assignor to Rapistan Incorporated, a corporation of Michigan
Filed Aug. 17, 1966, Ser. No. 573,023
13 Claims. (Cl. 193—35)

This invention relates to conveyors and, more particularly, to a telescopic conveyor having support means intermediate its ends which automatically compensate for intermediate height changes resulting from extension and retraction of the several conveyor sections.

It is often desirable in the handling of articles to have available one or a plurality of telescopic conveyors which may be moved from location to location and adjusted in length so as to conform to the particular working environment. Usually, such telescopic conveyors are of the gravity type requiring the conveyor bed to have a predetermined pitch. These conveyors may be utilized in conjunction with permanent powered conveyor systems or may be utilized by themselves as a means of conveying goods which are handled by hand at either extremity of the conveyor.

Basically, telescopic conveyors consist of two or more conveyor sections slidably mounted in piggy-back relationship, the various sections being adapted to be extended and retracted with respect to one another in telescopic fashion. If the reach of the extended conveyor is relatively long, it will be apparent that some type of support means must be provided intermediate the ends thereof to prevent sag along the conveyor line. In the past, a plurality of manually adjustable supports, usually on wheels, have been utilized for this purpose. Conventionally, these supports comprise telescopic pipe sections affixed to various sections of the conveyor in such a manner that they will be spaced relatively uniformly therealong when the conveyor is extended. After such extension, each of these supports is manually adjusted to impart a constant pitch to the conveying mechanism. Assume, for example, that it were desirable to utilize the conveyor to transport goods from the rear doors of an enclosed trailer to the front for stacking. A conventional telescopic conveyor must be rolled onto the truck bed, extended, and then adjusted at the intermediate supports to provide a uniform pitch along which the goods will flow smoothly under the influence of gravity.

In addition to being time consuming, the manual adjustment of the intermediate supports is difficult to execute in such a manner that a satisfactory flow of materials is obtained. For example, if corresponding support legs on opposite sides of the conveyor are not exactly even the conveyor bed will slant sideways and the goods will tend to track eccentrically, falling from the side of the conveyor rather than traveling its length. Also, failure to provide the proper slope may result in the articles becoming hung up on the conveyor. Similar mishaps will occur in the event that one of the telescopic legs collapses unintentionally.

It is an object of this invention to provide a telescopic conveyor which is not subject to the above outlined disadvantages.

More particularly, it is an object of this invention to provide a telescopic conveyor embodying two or more sections and an intermediate wheeled support operative to insure that the conveyor sections will not be slanted sideways when the conveyor has been extended.

It is an object of this invention to provide a device of the type described which positively eliminates unintentional collapse of the intermediate supports and attendant damage to the conveyor and the goods traveling therealong.

It is an object of this invention to provide a telescopic conveyor having a plurality of intermediate supports which automatically adjust to changes in conveyor height as the conveyor is extended or retracted.

It is an object of this invention to provide a telescopic conveyor which automatically adjusts the height of the intermediate sections to maintain a uniform pitch.

It is an object of this invention to provide a locking device for utilization in conjunction with a telescopic conveyor of the type described which functions to cause the individual conveyor sections to expand and retract with respect to one another in a predetermined order.

It is an object of this invention to provide a telescopic conveyor having intermediate supports which are freely adjustable in height during the time period in which the conveyor sections are being expanded and retracted but which, in response to weights placed on the conveyor, lock into load supporting relationship therewith.

These and other objects of this invention will be clearly understood by reference to the following specification and accompanying figures in which:

FIG. 1 is a diagrammatic, side-elevational view of a collapsed or retracted telescopic conveyor fabricated in accordance with the teachings of this invention;

FIG. 2 is a diagrammatic, side-elevational view of the telescopic conveyor in its extended position;

FIG. 3 is a fragmentary, cross sectional view taken along line III—III of FIG. 2;

FIG. 8 is a fragmentary, cross sectional view taken along line VIII—VIII of FIG. 4;

FIG. 9 is a fragmentary, side-elevational view illustrating the details of the section locking mechanism;

FIG. 10 is a fragmentary, front-elevational view of the locking mechanism;

FIG. 11 is a diagrammatic illustration indicating the variation in height and pitch of the intermediate conveyor reach during extension thereof; and FIG. 12 is a diagramatic illustration indicating the section-by-section variation in height of the intermediate conveyor reach during retraction thereof.

Briefly, this invention comprises plurality of conventional gravity conveyor sections vertically mounted in slidable fashion with respect to one another and being adapted to extend and retract in telescopic fashion. Support means of rigid height are mounted at one end of the uppermost of the conveyor sections and at the opposite end of the lowermost of said conveyor sections. The two rigid support means are of differing heights whereby the conveyor, both when retracted and extended, has sufficient pitch to be operative. One or more intermediate support means are positioned between the front and rear support structures for supporting the intermediate length of the conveyor when the sections are extended. Means are provided for automatically varying the height of the intermediate support means during the extension and retraction of the conveyor sections whereby the conveyor will be rigidly supported at several locations intermediate its stationary end supports. The variable height intermediate support means ore locked into load supporting position by a cam in response to loads placed on the conveyor after it has been extended or retracted to the desired length.

Figure 7:
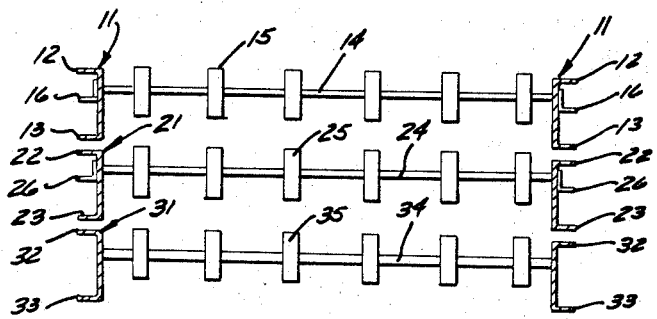
FIG. 7 is a fragmentary, cross sectional view taken along line VII—VII of FIG. 1.

Referring now to the figures, a preferred embodiment of this invention will be described in detail. FIGS. 1 and 2 show the telescopic conveyor which comprises an upper conveyor section 10, a middle conveyor section 20 and a lower conveyor section 30. As shown in FIG. 7, each of the conveyor sections has a pair of side frame members 11, 21 and 31 from which extend outwardly an upper rail 12, 22 and 32 and a lower rail 13, 23 and 33. Mounted between each of the side frame members 11, 21 and 31, in conventional fashion, are a plurality of shafts or cross rods 14, 24 and 34 and on these shafts are mounted rotatably a plurality of conventional conveying wheels 15, 25 and 35. The side frame members of each section are tied together by suitable rigid cross braces such as the braces 37 and 38. The upper conveyor section 10 and the middle conveyor section 20 each has an intermediate rail, 16 and 26 respectively, affixed to each side of their side frame members. The function of these intermediate rails will become apparent hereinafter.

Affixed to the forward extremity of each of the upper and middle conveyor sections is a conventional transfer ramp 90. Ramps 90 function to insure the smooth flow of goods at the conveyor section junctions.

The rear support assembly 40 comprises a set of wheels 41, a set of upright legs 42 and a pair of support flanges 43 for affixing the upright legs to the rear extremity of upper conveyor section 10. Rear support assembly 40 may be of any suitable vertical height and is of fixed height during normal operation of the apparatus. In a similar fashion, the front support assembly 45 is affixed to the forward end of lower conveyor 30 and comprises a pair of suitable rolling members 46 and a pair of legs 47 which are suitably affixed to the forward end of lower conveyor section 30 by means of flanges 48. The legs 47 are also of fixed height during normal conveyor operation. The legs 42 of rear support assembly 40 are longer than the legs 47 of front support assembly 45 such that the conveying apparatus is pitched from rear to front to enable goods to flow therealong under the influence of gravity.

Referring additionally to FIG. 3, middle conveyor section 20 is slidably and pivotably supported with respect to upper conveyor section 10 by means of the pivot roller assembly 50. This assembly comprises a support flange 51 suitably affixed at 52 to the upper rail 22 of middle conveyor section 20, a shaft 53 and a roller 54 suitably borne thereabout. An identical support assembly 50 is provided at the rearward extremity of lower conveyor section 30 which rotatably bears on the lower rail 23 of middle conveyor section 20. As will be obvious to those skilled in the art, one of the roller assemblies 50 such as is shown in FIG. 3 is provided at each side of the conveyor mechanism for each of the sectional connections. Thus, a total of four of the roller assemblies 50 are required in the embodiment shown in FIGS. 1 and 2 which comprises three slidably mounted conveyor sections.

The forward end of upper conveyor section 10 and the forward end of middle conveyor section 20 are supported by identical adjustable support assemblies indicated generally by the reference numeral 60. Therefore, a description of one will suffice for both. Referring additionally to FIGS. 4, 5, 6 and 8, the adjustable support assemblies 60 comprise a tubular horizontal support 61 (see FIG. 6) over which is positioned a concentric sleeve 62. A pair of wheel assemblies 63 are affixed to the tubular support 61 by any conventional means such as welding. In a similar manner, the rear legs 65 are affixed to each side of the upper conveyor section 10 and the middle conveyor section 20 at 66. The method of attaching the rear legs will be described hereinafter. As indicated in FIGS. 1 and 2, this mounting is preferably positioned adjacent the forward extremities of the conveyor sections to be supported.

The height adjustment assemblies 70 are affixed to the rear legs 65 of the adjustable support assemblies and comprise a slide 71 (see FIG. 8) having upper and lower guides 72 which slidably engage the intermediate rails 16 and 26 of upper conveyor section 10 and middle conveyor section 20 respectively. Pivotably affixed to the intermediate flange tracker 71 at 74 is a leg bracket 73 which secures the rear leg 65 to the slide 71.

Figure 4:
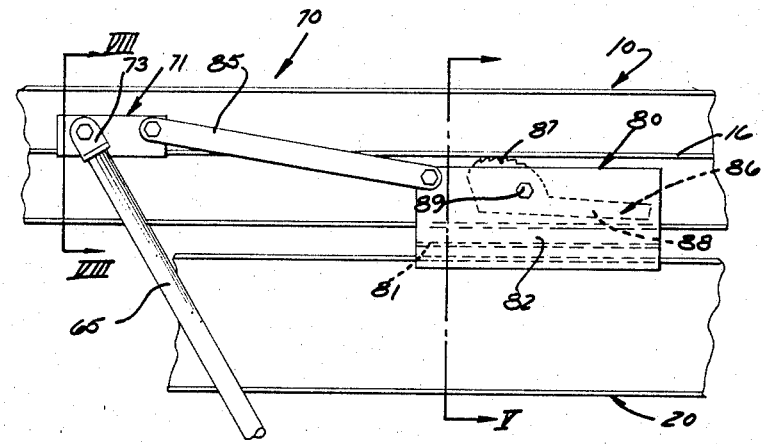
FIG. 4 is a fragmentary, side-elevational view of the intermediate support adjusting mechanism.
Figures 5, 6:
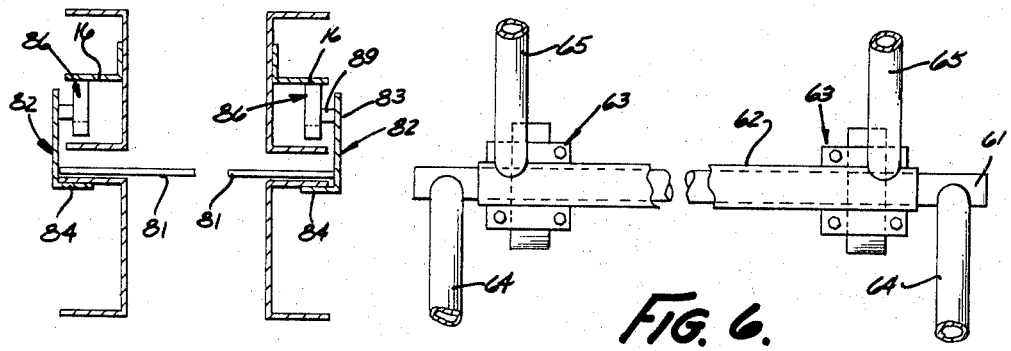
FIG. 5 is a cross sectional view taken along line V—V of FIG. 4.
FIG. 6 is a fragmentary, cross sectional view taken along line VI—VI of FIG. 2.

As shown best in FIGS. 4 and 5, the conveyor at each section joint has a pair of lock assemblies 80, one on each side, connected by a strap 81. The strap maintains a fixed spacing between the lock assemblies. It also rides on the upper surface of the side frames. The ends of the strap are affixed to the L-shaped plates 82 forming the sides of the lock assemblies (FIG. 5). The L-shaped plates 82 each have an upstanding side 83 and a bottom flange 84.

The lock assembly 80 is attached to the slide 71 for movement therewith by means of a connected rod 85. The camming mechanism 86 of the lock assembly 80 comprises an eccentrically mounted, serrated cam 87 having a counter-balance tail 88. As shown in FIGS. 4 and 5, the cam 87 is pivotably mounted to the upstanding side 83 of L-shaped plate 82 by any conventional pivot means such as indicated at 89. The balance of the cam is such that tail 88 forces the serrated surface thereof into contact with the lower side of the intermediate rail on the upper of the two conveyor sections associated with the particular adjustable vertical support. The cam 87 is mounted between the intermediate rail and the lower flange of the side frame of the upper conveyor section. The spacing between the rail and the flange is important as will be understood from the subsequent description.

Referring now to FIG. 11, the vertical line 40 corresponds to the rear support assembly 40 of the telescopic conveyor shown in FIGS. 1 and 2. The vertical line 45 corresponds to the front support assembly 45 on the telescopic conveyor shown in FIGS. 1 and 2. As noted, the absolute and relative heights of the components 40 and 45 remain constant throughout the extension and contraction of the apparatus. When forward support 45 is in the position indicated by the reference numeral 101, the conveyor bed 106 is in its retracted position; when it is in the position indicated by the reference numeral 102, the conveyor bed 107 has been extended to approximately two-thirds of its usable length; and when it is in the position indicated by the reference numeral 103, the conveyor bed 108 has been telescopically extended to its full reach. From an examination of FIG. 11, it will be readily apparent that as the conveyor section is extended, the conveyor bed at any particular point intermediate the extremities thereof rises vertically. Thus, as forward support assembly 45 is pulled from position 101 to position 102, the conveyor bed at the original longitudinal location of the support leg 45 (position 101) rises a distance represented by the numeral 104. As the forward support assembly 45 is pulled from position 102 to position 103, the conveyor bed at the prior longitudinal position of the forward support leg 45 (position 102) rises a distance indicated by the numeral 105 and at the position 101 rises a distance represented by the numeral 109. Thus, as the conveyor section is extended, the angle that the conveyor bed makes with a vertical plane at the rearward support assembly 40 progressively increases from $\theta$, through $\theta'$, and finally to $\theta''$. Actually, the leg 40 being fixed to the conveyor bed maintains a constant angular relationship with it while shifting from vertical to an inclined position with respect to the vertical plane. The same shift occurs with respect to the plane of the front leg 45.

In operation, as lower conveyor section 30 is telescopically extended to lengthen the reach of the conveyor, the intermediate points along the conveyor reach, at which adjustable support assembly 60 are positioned, rise vertically in a manner identical to that described in connection with FIG. 11.

If the vertical support assemblies 60 made no compensation for this change in height, their rollers 63 would be lifted from the floor. Such does not occur, however, since camming mechanism 86 allows free sliding movement of the lock assembly 80 to the right as viewed in FIG. 4. Such movement to the right decreases the angle α (see FIG. 1) to an angle α' (see FIG. 2) and this angular decrease effectively lengthens the adjustable support assemblies 60 in a vertical direction such that the rollers or wheels 63 thereon maintain contact with the surface upon which the conveyor has been placed. More particular, as lower conveyor section 10 is extended, tending to lift the wheels 63 of the support assemblies 60 from the floor, the weight of wheels 63 and legs 64 and 65 will cause the slide 71 on each side of each support assembly 60 and the associated horizontal positioning strap 81 and its attached lock assembly 80 to move to the right as viewed in FIG. 4. This increases the vertical height of the adjustable support assembly 60. The cam 86 will not interfere with this sliding movement because of the eccentric mounting and elliptical shape of its serrated engaging surface 87 will constantly urge the cam to disengage. At all times, of course, the rear extremities of the lower and middle conveyor sections are supported by their associated roller assemblies 50 on the lower flange of the upwardly succeeding conveyor section.

Once the conveyor has been extended to the desired length, and goods have been placed thereon for gravitational travel therealong, the weight of the boxes and the like passing above the adjustable support assemblies 60 will tend to cause the legs 64 and 65 to spread in such a manner as to increase the angle α'. The cam 86, however, prevents any such spreading. Counter-balance tail 88 causes the serrated camming surface 87 to be constantly biased into contact with the intermediate flange of the upper associated conveyor section and the eccentric mounting and elliptical shape of the camming surface cause it to bind thereagainst once the legs 64 and 65 of the particular support assembly begin to spread, thus preventing further spreading. Thus, once the conveyor has been extended to the desired length and adjustable support assembly 60 have assumed the desired support heights in the manner described above, goods may be moved along the conveyor without fear of its sagging along the intermediate sections of its reach since the adjustable support assemblies 60 will maintain their predetermined vertical position because of the engagement of camming surfaces 87 against intermediate rails 16 or 26.

Once the particular conveying operation has been completed, the forward conveyor section 30 is pushed back toward the rear support assembly 40 to retract the conveyor. As pointed out previously, the serrated camming surfaces 87 are in engagement with the intermediate rails on the upper and middle conveyor sections. Referring to FIG. 12, assume that the solid lines represent the conveyor in its extended position. Conveyor section 10 extends between rear support assembly 40 and one of the intermediate adjustable support assemblies 60; conveyor section 20 extends between the two adjustable intermediate support assemblies 60; and, the conveyor section 30 extends between the other intermediate adjustable support assembly 60 and the forward support assembly 45. As the forward support assembly 45 is pushed toward the phantom position shown in FIG. 11, the tendency of the intermediate section thereof to drop vertically will result in a downward pivoting of the section 30 around its supporting roller mounts 50. This pivoting is caused, of course, by the fact that the support assemblies 60 are locked against collapse and an increase in the angle α' between the legs. When only slight pivotable movement about roller assemblies 50 has occurred, the side frame of the particular conveyor section being retracted will drop and shift the L-shaped flanges 82 of the lock assembly downward with it. This downward movement disengages camming surfaces 87 from the intermediate rails on the associated upper conveyor section, allowing the slide 71 to move toward the left as viewed in FIG. 4. This movement increases the angle α' (see FIG. 1) and decreases the vertical length of the adjustable support assembly. As the conveyor is slid progressively inwardly and the various camming surfaces 87 are pivoted free from the intermediate rails, they engage when the conveyor sections are stationary, permitting the adjustable support assemblies to continually and progressively decrease in vertical height until such time as the conveyor sections have been completely telescoped to the position indicated in FIG. 1 and all support wheels are on the surface.

The disengagement of camming surfaces 87 from the the abutment of the underside of tail 88 of cam 86 against intermediate rails on the associated upper conveyor section during retraction of the conveyor results from (1) the dropping of the lock assembly downwardly and (2) the upper surface of the lower rail of the associated upper conveyor. This abutment prevents cam 86 from pivoting in a clockwise direction as viewed in FIG. 4 such that serrated surface 87 re-engages the lower surface of the middle rail. The clearance between tail section 88 and the lower conveyor rail should be such that serrated surface 87 disengages from its locked position as soon as the lower conveyor section pivots slightly with respect to the upper section during the retraction process.

As a means of obtaining the greatest possible mechanical lifting advantage during the time that the conveyor sections are being telescoped to their extended position, and thus, as a means of allowing extension with greatest possible ease, it is preferable that the lower section 30 slide to its expanded position with respect to middle section 20 prior to the time that middle section 20 begins to slide with respect to upper section 10. One convenient assembly for accomplishing this function is shown in FIGS. 9 and 10 comprises a sleeve 92 rotatably affixed to the pivot mechanism 66 of forward legs 64 on middle conveyor section 20. Affixed to sleeve 92 is an upwardly and rearwardly extending arm 93 having an inwardly extending locking surface 94 affixed thereto. Also affixed to sleeve 92 is a lower and forwardly extending arm 95 having a lifter mechanism 96 extending inwardly therefrom. A suitable slot 97 is provided in the lower section of the ramp 90 affixed to upper conveyor section 10 for engaging the locking section 94 of upwardly and rearwardly extending arm 93. Mounted on the lower rail of lower section 30 is a lifting member 98 having a sloped camming surface 99. The lifting mechanism 98 is positioned such that it contacts lifter 96 on lower and forwardly extending arm 95 when lower conveyor section 30 has been extended or telescoped outwardly to its terminal position with respect to middle conveyor section 20. As cam surface 99 strikes lifter 96, it causes it to raise and thus rotate sleeve 92 about mount 66 in a counterclockwise direction as viewed in FIG. 9. This rotation withdraws locking member 94 from slot 97 on ramp 90 and permits the upper section 10 and the middle section 20 of the conveyor to begin to slide with respect to one another. Since arm 95 is longer than arm 93, sleeve 92 is constantly biased in a clockwise direction as viewed in FIG. 9. Clockwise movement is limited, however, by the abutment of locking member 94 against the underside of the upper rail of section 20 such that locking flange 94 does not swing any further than necessary to engage slot 97 in ramp 90. As will be apparent to those skilled in the art, any suitable type of camming surface 98 may be provided on ramp 90 for depressing locking member 94 against its gravitational bias during the time that the conveyor sections are being retracted with respect to one another and relocking flange 94 and slot 97 together such that they will not slide with respect to one another thereafter until such time as lower conveyor section 30 has again been completely extended to allow cam 99 to raise lifter 96.

While the preferred embodiment of this invention has been illustrated as comprising three separate conveyor sections, it will be readily apparent to those skilled in the art that the teachings set forth herein will find applicability equally to environments necessitating more or less slidably mounted sections. As will similarly be apparent to those skilled in the art, many other modifications of this

I claim:

1. In a telescopic conveyor having an upper section and lower section, said sections being inclined from one end to the other and vertically superimposed and longitudinally slidable with respect to each other, and means connecting said sections for telescoping movement and holding them substantially parallel to each other, and a first support of fixed height at said one end of said upper section and a second support of fixed height at said other end of said lower section, and an intermediate support for supporting said conveyor adjacent the juncture of said upper and lower sections when said conveyor is extended, the improvement in said intermediate support comprising: said intermediate support having a pair of legs pivotally connected at a point spaced below said sections for angular adjustment with respect to each other; the upper end of one of said legs being pivotally connected to one of said sections; a bracket mounted on said one section for sliding movement therealong; the upper end of the other of said legs being pivotally connected to said bracket; a lock for detachably engaging said bracket to said one section against sliding movement, said lock having means automatically shifting into locked position under the weight of loads placed on said sections when said sections are telescopically extended with respect to each other.

2. The apparatus as set forth in claim 1 wherein the upper end of one of said legs is pivotally connected to the upper of said sections. wherein said bracket is slidably mounted on said upper section and wherein said lock engages said bracket to said upper section.

3. In a telescopic conveyor having a plurality of conveyor section vertically mounted in slidable fashion with respect to one another, said sections adapted to extend and retract with respect to each other in telescopic fashion;

first support means of relatively fixed height mounted on one end of the uppermost of said conveyor sections and second support means of relatively fixed height mounted on the other end of the lowermost of said conveyor sections, the height of one of said first and second support means being greater than the height of the other of said first and second support means whereby said conveyor sections are inclined with respect to the surface upon which they are resting;

intermediate support means positioned between said front and rear support means for supporting the intermediate length of said conveyor when said sections are extended;

means for automatically varying the height of said intermediate support means as said conveyor sections are extended and retracted; and cam means for locking said varying means in response to loads placed on said conveyor when said conveyor has been extended or retracted to the desired length.

4. The combination as set forth in claim 3 wherein said intermediate support means and said means for varying the height thereof comprise:

a first pair of legs pivotably affixed to opposite sides of at least one of said conveyor sections at a location intermediate the extremities of said conveyor when it is extended, said legs being adapted to remain in contact with the surface upon which said conveyor is positioned despite variations in the vertical height of their point of pivotable attachment due to extension and retraction of the conveyor sections by pivoting with respect thereto; and a slide mechanism slidably affixed to at least one of said conveyor sections and connected to said legs whereby, as said legs pivot with respect to said conveyor sections, said slide means slides therealong.

5. The combination as set forth in claim 4 wherein said camming means comprises a camming member mounted for eccentric rotation with respect to one of said sections and an elongated surface affixed to the conveyor section upon which said slide mechanism is slidably mounted and extending the length of the path of sliding movement thereof, said cam being adapted to engage said surface when said legs tend to pivot so as to decrease the vertical height of said intermediate support means.

6. The combination as set forth in claim 5 wherein said slide mechanism is affixed to said first pair of legs by means of a second pair of legs pivotably affixed to said first pair of legs at a point relatively removed from said conveyor sections, the other extremities of said second pair of legs being pivotably affixed to said slide mechanism whereby said first and second pairs of legs form a generally V-shaped support structure having a vertex angle adapted for change by the sliding of said slide mechanism.

7. The combination as set forth in claim 3 wherein said intermediate support means and said means for varying the height thereof comprise:

a first pair of legs pivotably affixed to opposite sides of at least one of said conveyor sections at a location intermediate the extremities of said conveyor when it is expanded, said legs being adapted to remain in contact with the surface upon which said conveyor is positioned despite variations in the vertical height of their points of pivotable attachment due to expanson and contraction of the conveyor sections by pivoting with respect thereto;

a slide mechanism slidably affixed to said one conveyor section, said slide mechanism being connected to said first pair of legs by means of a second pair of legs pivotably affixed to said first pair of legs at a point relatively removed from said one conveyor section whereby said first and second pairs of legs form a generally V-shaped support structure having a vertex angle adapted for change in response to sliding movement of said mechanism;

a cam carrying structure slidably mounted to another of said sections, said structure being affixed to said slide mechanism for movement therewith; and a camming member eccentrically mounted within said structure and being biased into contact with a surface of said one conveyor section whereby said pairs of legs are free to vertically lengthen but restricted against vertical shortening.

8. The combination as set forth in claim 7 which further comprises an elongated surface affixed to the conveyor section upon which said tracking mechanism is slidably mounted and extending the length of the path of sliding movement thereof, said cam being adapted to engage said surface when said legs tend to pivot so as to decrease the vertical height of said intermediate support means.

9. The combination as set forth in claim 8 wherein said first pair of legs is pivotably mounted to the forward extremity of one of said sections, said slide mechanism is slidably mounted to the elongated surface of said same section, and said cam carrying structure is slidably mounted to the next lower section.

10. The combination as set forth in claim 9 wherein said lower section is slidably connected to said one section by means of a set of rollers which permit, in addition to sliding movement, slight pivotable movement between said one section and the lower section whereby, as said lower section is retracted it and the cam carrying structure slidably mounted thereon will pivot about said rollers, retract said cam mechanism from said surface, and allow said support structure to collapse to such point as the cam mechanism resumes contact with said elongated surface.

11. The combination as set forth in claim 10 wherein said conveyor comprises more than two sections and which further comprises means for preventing any section other than the lower two from telescopically expanding with respect to one another until the expansion of said lower two sections is completed.

12. In a telescopic conveyor having an upper section and lower section, said sections being inclined from one end to the other and vertically superimposed and longitudinally slidable with respect to each other, and means connecting said sctions for telescoping movement and holding them substantially parallel to each other, and a first support of fixed height at said one end of said upper section and a second support of fixed height at said other end of said lower section and an intermediate support for supporting said conveyor adjacent the juncture of said upper and lower sections when said conveyor is extended, said intermediate support comprising:

a pair of spaced rail members affixed to the side of said upper section and a single rail member affixed to the side of said lower section;

a pair of legs pivotably connected at a point spaced below said sections for angular adjustment with respect to each other, the upper end of one of said legs being pivotally connected to said upper section;

a bracket slidably mounted on one of said spaced rail members, the other of said legs being pivotally connected to said bracket;

a lock assembly slidably mounted on said single rail, said assembly having an upstanding member extending above the lowermost of said spaced rails;

means connecting said bracket to said lock assembly for sliding movement therewith; and camming means having a rail engaging surface pivotally mounted on said upstanding members, said camming means being eccentrically mounted and biased such that said surface engages one of said pair of spaced rails when said bracket and said assembly tend to slide away from the pivoted connection of said one leg to said upper section and disengages said one of said pair of spaced rails when said bracket and said assembly tend to slide toward said pivotal connection of said one leg to said upper section.

13. The apparatus as set forth in claim 12 wherein said rail engaging surface engages the uppermost of said spaced rails and wherein said camming means further comprises a tail section extending from said camming means and biasing it about its pivotal mounting on said upstanding member such that said surface tends to abut said uppermost of said spaced rails, said tail section extending closely adjacent the lowermost of said spaced rails and adapted to abut thereagainst and pivot the engaging surface of said camming means out of engagement with the uppermost of said rails when said lock assembly drops downwardly with respect to said upper conveyor section.

References Cited

UNITED STATES PATENTS 3,216,552  11/1965  Lister _____ 193—35

EDWARD A. SROKA, *Primary Examiner.*

UNITED STATES PATENT OFFICE
CERTIFICATE OF CORRECTION

Patent No. 3,378,125

April 16, 1968

Daniel A. Fogg

It is certified that error appears in the above identified patent and that said Letters Patent are hereby corrected as shown below:

Column 6, lines 9 to 12, cancel "the abutment of the underside of tail 88 of cam 86 against intermediate rails on the associated upper conveyor section during retraction of the conveyor results from (1) the dropping of the lock assembly downwardly and (2)" and insert -- intermediate rails on the associated upper conveyor section during retraction of the conveyor results from (1) the dropping of the lock assembly downwardly and (2) the abutment of the underside of tail 88 of cam 86 against --.

Signed and sealed this 9th day of September 1969.

(SEAL)
Attest:

Edward M. Fletcher, Jr.
Attesting Officer

WILLIAM E. SCHUYLER, JR.
Commissioner of Patents